June 21, 1966  E. E. LA ROQUE  3,257,125
CAMPING TRAILER DEVICE
Filed Jan. 23, 1964
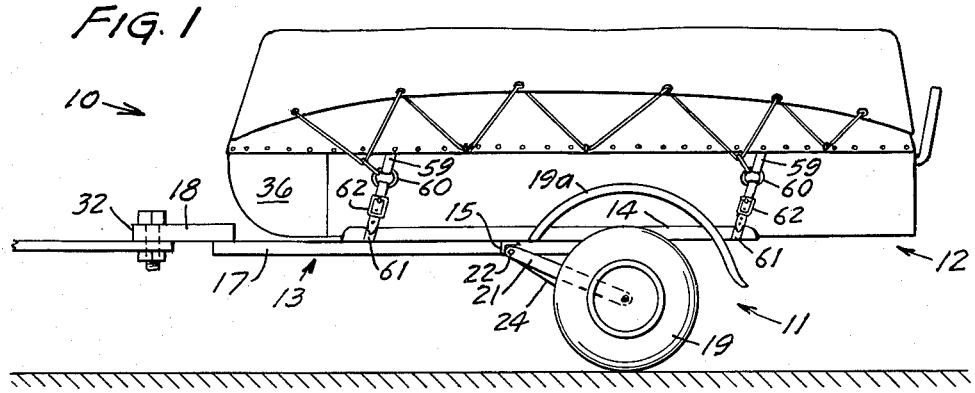
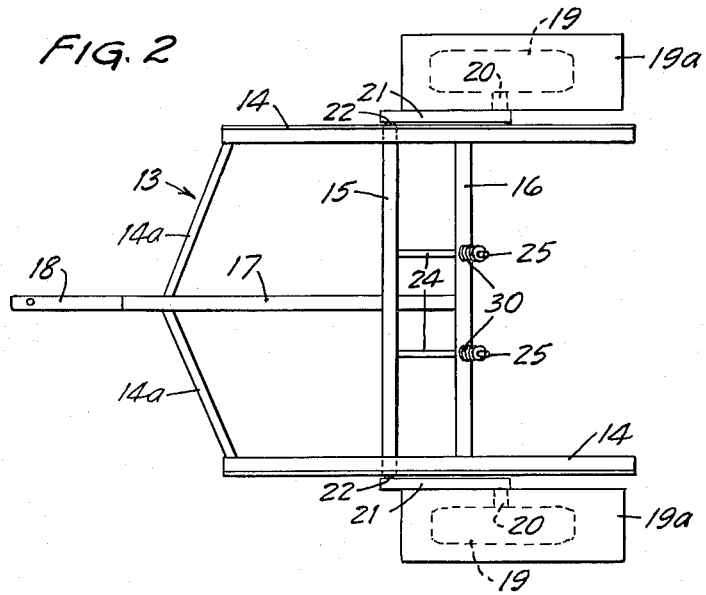
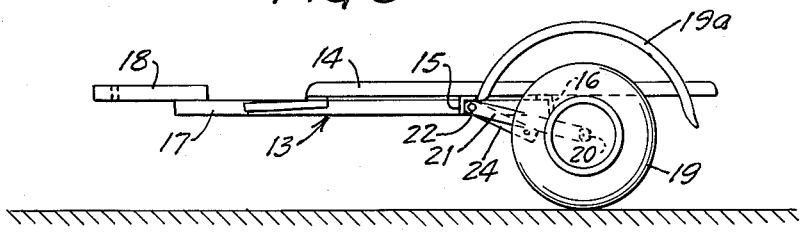
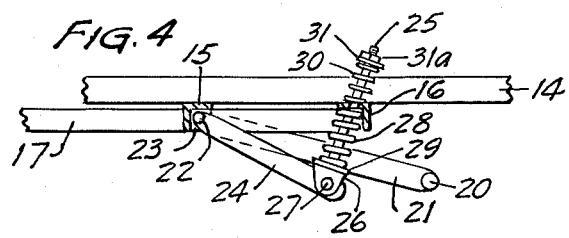
INVENTOR
ERNEST E. LA ROQUE
BY Williamson + Palmatier
ATTORNEYS

United States Patent Office 3,257,125
Patented June 21, 1966

3,257,125
CAMPING TRAILER DEVICE
Ernest E. La Roque, Williston, N. Dak., assignor of one-fourth to Michael R. McIntee, Williston, N. Dak.
Filed Jan. 23, 1964, Ser. No. 339,764
6 Claims. (Cl. 280—414)

This invention relates to camping equipment and more specifically to mobile trailer device.

An object of this invention is to provide a novel trailer construction for use in supporting boats and the like and including a shock absorbing suspension system operable to dampen and absorb all impact thrust during travel of the trailer construction over the ground.

A more specific object of this invention is to provide the novel trailer device including a chassis ranged and constructed for use in supporting lowered boats and the like, and having a pair of ground engaging wheels supporting the chassis for travel over the surface of the ground, and a shock absorbing suspension system providing independent suspension for each of the ground engaging wheels to dampen and absorb all impact thrust during travel of the trailer device over the ground.

These and other objects and advantages of my invention will more fully appear from the following description made in connection with the accompanying drawings, wherein like character references refer to the same or similar parts throughout the several views, and in which:

FIG. 1 is a side elevational view of the trailer device illustrating a water craft mounted thereon with the cover structure in a collapsed position;

FIG. 2 is a top plan view of the mobile trailer device;

FIG. 3 is a side elevational view of the mobile trailer device; and

FIG. 4 is a fragmentary diagrammatic view on an enlarged scale illustrating the suspension mechanism for the mobile trailer device.

Referring now to the drawings, and more specifically to FIGS. 1 and 4, it will be seen that one embodiment of the novel trailer device, designated generally by the reference numeral 11, is there shown. The mobile trailer device 11 is illustrated in FIG. 1 in supporting relation with a camping device 10 which is of a size to comfortably accommodate two or three campers. The trailer device 11 is also capable of supporting boats and the like which are removably mounted upon the frame thereof by suitable releasable securing means.

The mobile trailer device 11, as best seen in FIGS. 1 through 4, is comprised of a generally horizontally disposed frame 13, which includes a pair of laterally spaced-apart, parallel, longitudinal frame elements 14, each being of suitable angle iron construction and being interconnected intermediate their respective ends by a front transverse frame element 15 and a rear transverse frame element 16. These frame elements 15 and 16 are also of suitable angle iron construction. An elongate central frame element or tongue 17 has its rearmost end portion rigidly connected to the transverse frame elements 15 and 16 respectively and projects forwardly therefrom, as best seen in FIG. 2. This central frame element or tongue 17 in the embodiment shown is preferably of rectangular or channel-shaped cross sectional configuration and the forward end portion thereof is provided with a hitch mounting extension element 18, the latter carrying part of a hitch mechanism thereon.

Referring again to FIG. 2 it will be seen that a pair of substantially identical front frame elements 14a each have one end rigidly connected to the front end of one of the longitudinal frame elements 14 and have their respective other or forward ends thereof rigidly connected as by welding to the central frame element 17.

The frame 13 is supported for travel over the surface of the ground by suitable ground engaging wheels 19, which are of conventional construction. While being of conventional construction, the ground engaging wheels 19 are provided with suitable pneumatic tires and are also provided with conventional wheel bearings, each wheel being revolvably mounted upon a stub axle 20. The inner end of each stub axle 20 is rigidly connected as by welding to the rear end of a forwardly and upwardly extending suspension arm 21, as best seen in FIGS. 2, 3 and 4. It will be seen that these suspension arms 21 are of substantially identical construction and the respective forward upper ends of each suspension arm is rigidly connected to one of a pair of similar rock shafts 22. The rock shafts 22 are supported from suitable bearings 23 carried by the front transverse frame element 15. These rock shafts 22 while being laterally spaced-apart from each other are also disposed in substantially coaxial relation. Thus any vertical movement of the ground engaging wheels 19 will be transmitted through the suspension arms 21 to the rock shaft 22 causing the rock shafts to revolve about their respective longitudinal axes.

Each rock shaft 22 has its inner end rigidly connected as by welding to the front end of one of a pair of similar rock arms 24, as best seen in FIG. 4. These rock arms 24, as best seen in FIG. 2, are disposed in substantially spaced-apart relation with respect to each other but are substantially centrally located with respect to the sides of the frame 13. It will also be noted that these rock arms 24 extend downwardly and rearwardly and have their rearmost ends disposed below and slightly forwardly of the rear transverse frame element 16.

Referring again to FIGS. 2, 3 and 4 it will be seen that a pair of elongate upwardly and rearwardly extending thrust rods 25 are provided, each having its lowermost end bifurcated to define a pair of attachment ears 26, the attachment ears for each thrust rod 25 being pivotally connected by a pivot 27 to the rear end of one of the rock arms 24. It will be noted that the rear transverse frame element 16 is apertured to permit the thrust rods 25 to project upwardly and slightly rearwardly therethrough from their associated rock arms 24. Each thrust rod 25 has a relatively large helical spring 28 positioned therearound, the upper end of the springs 28 bearing against the lower surface of the rear transverse frame element 16 and the lower end of each spring element 28 engaging an annular collar 29 carried by the lower end of the associated thrust rod 25.

Each thrust rod 25 is also provided with a smaller or lighter helical spring 30 positioned therearound in opposed relation with respect to the springs 28. It will be noted that the lowermost end of each of the smaller springs 30 bears against the upper surface of the rear transverse frame element 16 while the upper end of each spring 30 bears against the collar 31, the latter being secured to its associated thrust rod by a suitable retaining nut assembly 31a. Thus it will be seen that upward swinging movement of the rock arms 24, as viewed in FIG. 4, will be against the bias of the heavy helical coil spring 28, while downward movement of the rock arms 24, as viewed in FIG. 4, will be against the bias of the smaller helical coil spring 30. Thus when the ground wheels 19 traverse rough terrain, the shock stresses or impulses will be dampened by the shock absorbing suspension mechanism so that the load carried by the chassis will not be subjected to undue stress or strain. This suspension and shock absorbing mechanism allows each ground wheel to react independently of the other ground wheel so that substantially all shock impulses generated by travel of the ground wheels over rough terrain will be absorbed and will not be transmitted to the load.

The forward end of the extension element 18 for the central frame element or tongue 17 has the conventional hitch mechanism carried thereby. This hitch mechanism is part of a ball and socket connection conventionally used in coupling a trailing vehicle to a prime mover. The other hitch member will be carried by the automobile or motorcycle as the case may be and in the embodiment shown will constitute a male or ball mechanism for releasable connection to the female socket mechanism 32. The ground engaging wheels 19 are also provided with suitable fender guards 19a of arcuate construction and which are carried by the frame 13, as best seen in FIGS. 2 and 3.

The means utilized to releasably but firmly secure the camping device 10 upon the frame 13 of the trailer device 11 comprises a plurality of elongate similar attachment straps 59 each being formed of a flexible fabric material and each having one end secured to the camping device 10 adjacent the longitudinal marginal edges thereof. In the embodiment shown, two such straps 59 are provided for each side and each strap is provided with an annular attachment ring 60 secured to the free end thereof, the ring 60 being preferably formed of metallic material. A pair of elongate attachment belts or straps 61 having suitable buckle means at the ends thereof are looped over the attachment rings 60 in a well known manner and underlie the chassis frame 13 to very securely but releasably mount the trailer body structure upon the trailer device 11.

As pointed out above, the suspension mechanism of the trailer device permits all vibration and shock impulses to be dampened and absorbed so that the shock impulses and vibrations to thereby minimize such impulses and vibrations with respect to any transported structure mounted on the trailer device. It will be noted that in the embodiment shown, the upper surface on the chassis frame 13 actually constitutes a supporting surface for any supported structure mounted on the trailer device such as a camping device 10.

It will also be noted from the foregoing description comprises of a mobile chassis having a unique suspension and shock absorbing means and which is operable to very effectively dampen and absorb vibration and shock impulses during travel of the chassis over rough terrain.

Thus it will be seen that I have provided a trailer device which is not only of simple and inexpensive and economic construction, but one which functions in a more efficient manner than any heretofore known comparable devices.

It will, of course, be understood that various changes may be made in the form, details, arrangement and proportions of the various parts without departing from the scope of my invention.

What is claimed is:

1. A mobile trailer apparatus for use in supporting a boat or the like, said apparatus comprising
a rigid frame presenting a normally oriented horizontal upper support surface and having front and rear end portions,
hitch means carried by the front end portion of said frame for connection to a vehicle such as an automobile, motorcycle or the like,
a pair of ground engaging wheels disposed at opposite sides of the frame and supporting the latter for travel over the ground,
means defining an independent suspension for said wheels comprising a pair of elongate suspension arms each having one end thereof connected with one of said wheels and projecting substantially forwardly longitudinally of the direction of travel of the frame,
a pair of elongate laterally spaced-apart rock shafts each being mounted for rotation on said frame about a substantially horizontal transverse axis and each having one end thereof fixedly connected with the other end of one of said suspension arms for movement therewith,
a pair of vertically swingable rock arms each having one end thereof secured to the other end of one of said rock shafts for movement therewith and extending rearwardly therefrom, said rock arms being mounted for limited vertical swinging movement relative to said frame,
and a pair of resilient means each engaging one of said rock arms and projecting upwardly therefrom and engaging said rigid frame and being operable to resist movement of the same in either direction during swinging movement thereof.

2. A mobile trailer apparatus for supporting a bat or the like, said apparatus comprising
a rigid frame presenting a substantially horizontally oriented upper supporting surface, and having opposite side portions and front and rear end portions,
hitch means carried by the front end portion for connection to a vehicle such as automobiles, motorcycles or the like,
a pair of ground engaging wheels positioned at opposite sides of said frame and each being revolvably mounted upon a stub axle,
means yieldably connecting said stub axle of each of said wheels with said frame and defining an independent suspension for each wheel for dampening and resisting shock impulses, said suspension means comprising
a pair of fore-and-aft extending elongate, suspension arms each having one end thereof connected with one of said wheel stub axles and projecting therefrom,
a pair of elongate, spaced-apart rock shafts each being mounted for rotation on said frame about a substantially horizontal transverse axis, and each having one end thereof fixedly connected with the other end of one of said suspension arms for movement therewith,
a pair of laterally spaced-apart fore-and-aft extending elongate rock arms each having one end thereof fixedly connected with the other end of one of said rock shafts for movement therewith, and extending rearwardly therefrom, said rock arms being mounted for limited vertical swinging movement relative to said frame,
means for resisting movement of said rock arms to dampen and absorb vibration and shock impulses transmitted through said rock arms, said means for each rock arm comprising a pair of resilient members each being interconnected with one of said rock arms and engaging said rigid frame and being operable to resist movement of each rock arm in either direction during swinging thereof.

3. The apparatus as defined in claim 2 wherein said suspension arms and said rock arms are disposed in substantially parallel relation, and wherein said suspension arms are of greater length than said rock arms.

4. The apparatus as defined in claim 2 wherein said rock shafts are disposed in substantially coaxial relation.

5. A mobile trailer apparatus for supporting a boat or the like, said apparatus comprising
a rigid frame structure normally oriented to present a substantially horizontal upper supporting surface, and having front, rear and opposite side portions,
a pair of ground engaging wheels positioned at opposite sides of said frame and each being revolvably mounted upon a stub axle,
means yieldably connecting said stub axle of each of said wheels with said frame and defining an independent suspension for said wheels for dampening and absorbing shock and vibration impulses, said suspension means comprising a pair of elongate suspension arms each having one end thereof connected with one of said wheel stub axles and projecting forwardly therefrom, a pair of elongate, laterally spaced-apart rock shafts each being mounted for rotation on said frame about a substantially horizontal transverse axis and each having its outer end fixedly connected with the forward end of one of said suspension arms for movement therewith, a pair of elongate, laterally spaced-apart rock arms each having one end thereof fixedly connected with the inner end of one of said rock shafts for movement therewith and each rock arm extending rearwardly therefrom, said rock arms being mounted for vertical swinging movement relative to said frame, means for resisting movement of said rock arms to dampen and absorb vibrations and shock impulses transmitted through said rock arms from said ground engaging wheels, said means for each rock arm comprising a thrust rod connected with the rear end portion of the associated rock arm and projecting upwardly therefrom, for limited slidable engagement with the frame, a pair of coil spring members carried by each thrust rod, and each spring member engaging said frame, one of said spring members of each pair engaging one of said rock arms, said spring members being operable to resist movement of each rock arm in either direction during vertical swinging movement thereof.

6. The apparatus as defined in claim 5 wherein one of said coil spring members for each rock arm is positioned below said frame and the other of said coil spring members of each pair is disposed above the frame.

References Cited by the Examiner

UNITED STATES PATENTS

| | | | |
|---|---|---|---|
| 590,234 | 9/1897 | McTurk | 301—133 |
| 1,177,237 | 3/1916 | Egan. | |
| 2,496,599 | 2/1950 | Rivers. | |
| 3,045,263 | 7/1962 | Blachly | 9—1 |
| 3,083,986 | 4/1963 | Moddy et al. | 280—414 |
| 3,107,369 | 10/1963 | Zijlstra | 9—1 |
| 3,142,494 | 7/1964 | Kelley | 280—414 |

FOREIGN PATENTS

| | | |
|---|---|---|
| 458,846 | 8/1913 | France. |
| 772,990 | 8/1934 | France. |
| 193,811 | 1/1938 | Switzerland. |

LEO FRIAGLIA, *Primary Examiner.*

MILTON BUCHLER, *Examiner.*

A. H. FARRELL, *Assistant Examiner.*